Sept. 20, 1938.    D. H. PETERSON    2,130,650
DEVICE FOR HOLDING FISHING RODS OR POLES
Filed July 8, 1935
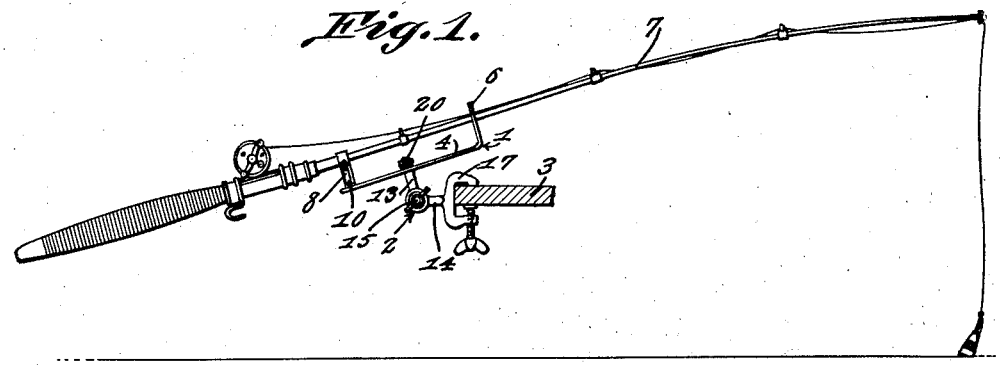
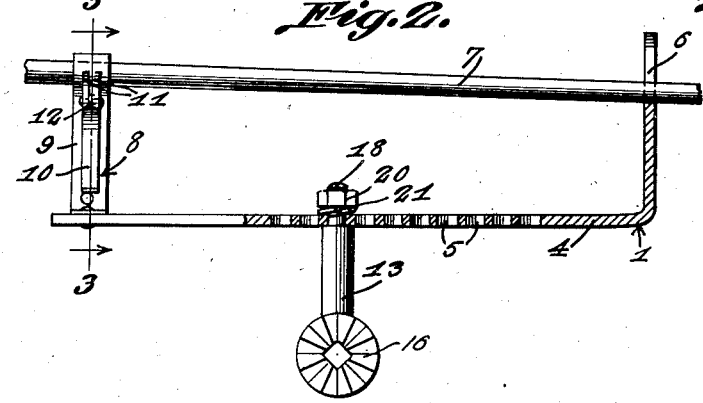
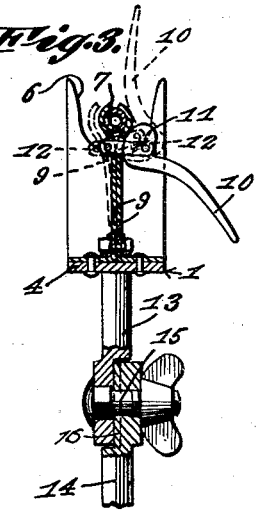
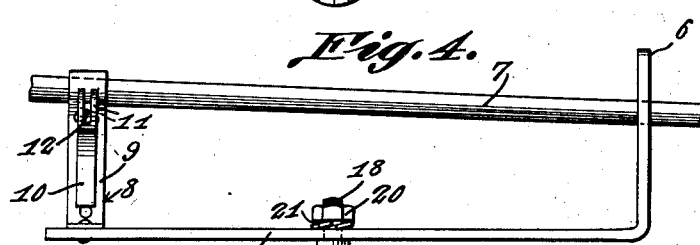
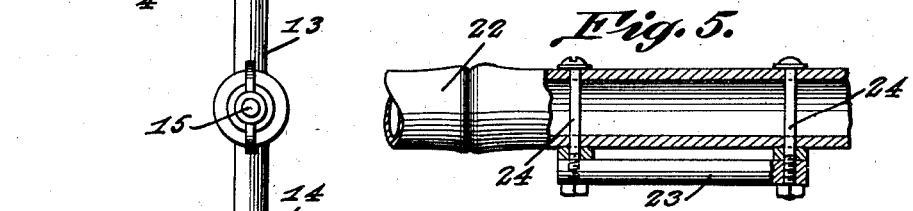
David H. Peterson, INVENTOR
BY Victor J. Evans & Co.
ATTORNEY Patented Sept. 20, 1938

2,130,650

UNITED STATES PATENT OFFICE 2,130,650

DEVICE FOR HOLDING FISHING RODS OR POLES

David Herbert Peterson, Marion, Ohio

Application July 8, 1935, Serial No. 30,390

1 Claim. (Cl. 248—42)

This invention relates to a support for a fishing rod or pole and has for the primary object the provision of a device of this character which may have a rod or pole easily and quickly adapted thereto and will permit quick detachment of the pole or rod when necessary and may be mounted to suit the wishes of a fisherman and will permit balancing of the pole or rod at any desired angle and the turning thereof as desired.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, illustrating a fishing pole supported by my invention.

Figure 2 is a fragmentary side elevation, partly in section, showing the mounting for the fishing pole or rod.

Figure 3 is a transverse sectional view taken on the line 3—3 of Figure 2.

Figure 4 is a fragmentary side elevation illustrating a modified form of my invention.

Figure 5 is a fragmentary sectional view showing a pole or rod of a certain character equipped with means for adapting the pole or rod to my invention.

Referring in detail to the drawing, the numeral 1 indicates a mounting and 2 an adjustable bracket therefor so that said mounting may be readily adapted to a support 3 which may be part of a boat, wharf or some other device along a bank of a body of water.

The mounting 1 consists of a bar 4 having a plurality of spaced openings 5 and has one end bent at right angles and bifurcated to form a fork 6 in which rests a fishing pole or rod 7. A clamp 8 is secured to the other end of the bar 4 and includes flexible jaw-like members 9 to receive and grip the pole or rod 7. The jaw-like members 9 are brought into gripping position on the pole by the actuation of a lever 10. The lever at one end is in the form of a cam 11 contacting one of the jaw-like members and has pivoted thereto straps 12 connected with the other jaw-like member 9. The lever 10 when placed in the dotted line position of Figure 3, releases the fishing pole and when moved into full line position causes the jaw-like members to tightly grip the pole.

The adjustable bracket 2 consists of members 13 and 14 connected by a pivot bolt 15. The connected ends of the members 13 and 14 are enlarged and apertured to receive the pivot bolt 15 and also are provided with serrations 16 adapted to intermesh for the purpose of fastening the members 13 and 14 against pivotal action with respect to one another but which will permit said members to be adjusted at various angles to each other. The member 14 is formed integrally with a clamp 17 for attachment to the support 3. The member 13 is provided with a reduced screw threaded portion 18 which may pass through any one of the openings 5 of the mounting 1 and has threaded thereto a nut 20. Interposed between the nut 20 and the bar 4 of the mounting 1 is a lock washer 21. The mounting 1 is free to turn on the support 2 and also the mounting may be adjusted on the support 2 for the purpose of balancing the pole or rod carried by the mounting.

The member 14 of the support 2 instead of being formed with a clamp 17 may be constructed to provide a pointed member (not shown) so that it may be readily inserted in the bank or ground at the shoreline of a body of water.

Frequently fishermen desire to use bamboo poles as indicated at 22 in Figure 5, and to render such a pole applicable to my invention a bar 23 is secured thereto, as shown at 24. The bar 23 is to be engaged by the clamp 8.

A pole adapted to my invention as shown in Figure 1 will be efficiently supported thereby and may be caused to assume any angle desired and may swing in either direction due to the rotatable connection between the mounting 1 and the support 2. This connection, however, will offer sufficient resistance to prevent the pole from swinging accidentally or under the force of wind currents.

Having described the invention, I claim:

A device for holding a fishing pole comprising pivotally connected members capable of being adjusted angularly to each other and one adapted for connection to a support and the other member having the free end thereof reduced and screw threaded, a bar having a series of openings arranged longitudinally thereof and any one of the openings receiving the reduced screw threaded end of the last-named member, a nut threaded on said end of the last-named member, said bar having a portion thereof forked and bent at right angles thereto to form a rest for a fishing pole, flexible jaws secured to the bar and paralleling the forked portion of said bar to receive the pole, and means carried by said jaws to force the latter to grip said pole.

DAVID HERBERT PETERSON